United States Patent Office.

HUGO WEIL, OF BASLE, SWITZERLAND, ASSIGNOR TO SOCIETY OF CHEMICAL INDUSTRY IN BASLE, OF SAME PLACE.

GREEN WOOL-DYE AND PROCESS OF MAKING SAME.

SPECIFICATION forming part of Letters Patent No. 623,346, dated April 18, 1899.

Application filed March 2, 1898. Serial No. 672,308. (Specimens.)

*To all whom it may concern:*

Be it known that I, HUGO WEIL, doctor of philosophy and chemist, a subject of the King of Bavaria, residing at Basle, Switzerland, have invented new and useful Improvements in the Manufacture of Green Coloring-Matters for Dyeing Wool, (for which applications for Letters Patent have been filed in France, dated January 29, 1898, and in Great Britain, dated January 31, 1898,) of which the following is a full, clear, and exact specification.

Although it seems evident that para-nitro-benzaldehyde-ortho-sulfonic acid should lend itself to the production of coloring-matters of the malachite-green series, till now such coloring-matters derived from it have not been known. By my researches on the coloring-matters derived from para-nitro-benzaldehyde-ortho-sulfonic acid by condensing one molecule of it with two molecules of ethyl- or methyl-benzylanilin sulfonic acid or with two molecules of ethyl- or methyl-benzylanilin and sulfonating the two benzyl groups and oxidizing the resulting leuco compound—as is done, for example, in the ordinary acid-green process—it has been ascertained that the trisulfonated coloring-matters thus obtained are of little intensity and of inferior technical value. I have now found that coloring-matters of great intensity and which are in high degree fast to washing and milling and to alkalies are obtained if the coloring-matters derived from para-nitro-benzaldehyde-ortho-sulfonic acid and ethyl- or methyl-benzylanilin are constituted in compliance with the following conditions: first, the presence of no more than two sulfo groups in the molecule; second, the presence of two benzyl groups in the molecule; third, only one of the two benzyl groups should be sulfonated. Such new coloring-matters are obtained by the oxidation of the disulfonated leuco compounds produced as follows: first, by condensing para-nitro-benzaldehyde-ortho-sulfonic acid with two molecules of ethyl- or methyl-benzylanilin, carefully sulfonating the product with sulfuric acid to introduce one sulfo group, separating the formed disulfo compound by pouring the mixture into water, and filtering from the solution of dilute sulfuric acid and of any easily-soluble trisulfo-acid which may have been formed; second, by condensing one molecule of para-nitro-benzaldehyde-ortho-sulfonic acid in the presence of alcohol with the mixture of one molecule of ethyl- or methyl-benzylanilin sulfonic acid and one molecule of ethyl- or methyl-benzylanilin, dissolving the condensation product in a dilute solution of carbonate of soda or acetate of soda, and separating the leuco-disulfo-acid from the filtered solution by addition of dilute sulfuric acid. Under these conditions a small quantity of leuco-trisulfo-acid which may have been formed remains in the solution.

Example: Twenty-five parts, by weight, of sodium para-nitro-benzaldehyde-orthosulfonate is heated and continuously stirred with forty parts of ethyl-benzylanilin or methyl-benzylanilin and fifty parts of dilute sulfuric acid of thirty-per-cent. strength at 110° centigrade until the amin has disappeared. The aqueous solution is separated from the solid leuco-monosulfo-acid, which is then washed with a small quantity of water, dried, and pulverized. Fifteen parts of this product are introduced in one hundred parts of monohydrated sulfuric acid or sulfuric acid containing free sulfuric anhydrid in the cold, and after complete dissolution the liquid is heated in the water-bath until a portion dissolves completely in dilute soda-lye. The whole mixture is then poured into five hundred parts of ice-water and the precipitate filtered and washed with a little water on the filter for dissolving a small quantity of trisulfo-acid which has been formed. The residual leuco-disulfo-acid thus obtained is then dried. 2.4 parts of the leuco-disulfo-acid thus obtained are dissolved in 3.5 parts of a soda-lye of ten per cent. and fifty-five parts of water acidified with 3.3 parts of sulfuric acid of ten per cent. at an elevated temperature 1.8 parts of lead peroxid (paste of forty-five per cent.) are introduced. The oxidation immediately takes place, the resulting solution of the coloring-matter is filtered and evaporated, or the color precipitated with common salt. It forms in the dry state a dark powder with bronze luster, easily soluble in water, with a green coloration, which is not changed by addition of dilute mineral acids, dilute alkalies, and ammonia, and is a para-nitro-orthosulfo-benzaldehyde, with the formula $$CHO : SO_3Na : NO_2 = 1 : 2 : 4.$$

It produces on wool in an acid-bath a green shade of great fastness to alkalies and to milling. The solution in concentrated sulfuric acid is yellow and turns to green by addition of a great quantity of water. The aqueous solution of the coloring-matter treated with reducing agents and subsequently with lead peroxid turns from green to blue.

The nitrobenzaldehyde ortho-sulfo-acid used may be prepared by oxidation of para-dinitrostilbeneortho-disulfo-acid or of para-dinitrosostilbene-disulfo-acid with permanganate of potassium or by transforming the mononitrated ortho-chlorbenzylchlorid into nitroörthochlorbenzaldehyde and transforming the resulting nitroörthochlorbenzaldehyde into nitrobenzaldehyde ortho-sulfo-acid by the action of sulfite of sodium in the known manner.

What I claim is—

1. The herein-described process for the production of coloring-matters from paranitrobenzaldehyde-ortho-sulfonic acid, which consists in first forming a disulfo-leuco compound of the general formula:

$$C_6H_3(NO_2)-(SO_3Na)-C{\overset{H}{\underset{R'}{\vphantom{|}\smash{{-}R}}}}$$

wherein R designates alkylbenzylanilin and R′, monosulfonated alkylbenzylanilin, and then treating this disulfo-leuco compound with an oxidizing agent, substantially as set forth.

2. As a new article of manufacture, the herein-described coloring-matter derived from paranitrobenzaldehyde-ortho-sulfonic acid and alkylbenzylanilin and containing two sulfo groups, which dyes wool in an acid-bath a green shade having great resistance to alkalies and to milling, and is, in a dry state, a dark powder with bronze luster, easily soluble in water with a green coloration, which is not changed by addition of dilute mineral acids, dilute alkalies and ammonia and which dissolves in concentrated sulfuric acid with a yellow coloration that turns to green by addition of a great quantity of water, while by treating its aqueous solution with reducing agents and subsequently with lead peroxid, it turns from green to blue.

In witness whereof I have hereunto signed my name, this 16th day of February, 1898, in the presence of two subscribing witnesses.

HUGO WEIL.

Witnesses:
GEORGE GIFFORD,
AMAND RITTER.